(12) United States Patent
Madi et al.

(10) Patent No.: US 6,802,965 B2
(45) Date of Patent: Oct. 12, 2004

(54) APPARATUS FOR REMOVING HYDROGEN PEROXIDE FROM SPENT PICKLE LIQUOR

(75) Inventors: Vijay N. Madi, Fairfield, OH (US); Jerald W. Leeker, Trenton, OH (US)

(73) Assignee: AK Steel Corporation, Cincinnati, OH (US)

(*) Notice: Subject to any disclaimer, the term of this patent is extended or adjusted under 35 U.S.C. 154(b) by 0 days.

(21) Appl. No.: 10/683,717

(22) Filed: Oct. 10, 2003

(65) Prior Publication Data

US 2004/0074848 A1 Apr. 22, 2004

Related U.S. Application Data

(62) Division of application No. 10/119,112, filed on Apr. 9, 2002.
(60) Provisional application No. 60/282,563, filed on Apr. 9, 2001.

(51) Int. Cl.⁷ .................................................. C02F 1/20
(52) U.S. Cl. .................. 210/177; 134/105; 134/109; 210/180; 210/181; 210/188; 422/198; 422/224
(58) Field of Search ...................... 134/105, 109; 210/177, 180, 181, 188; 422/198, 224

(56) References Cited

U.S. PATENT DOCUMENTS

| | | | | |
|---|---|---|---|---|
| 3,318,448 A | * | 5/1967 | Fryer | 96/160 |
| 3,617,544 A | * | 11/1971 | Voss et al. | 210/739 |
| 4,197,139 A | * | 4/1980 | Hjersted | 134/12 |
| 4,208,285 A | * | 6/1980 | Sample, Jr. | 210/180 |
| 5,132,011 A | * | 7/1992 | Ferris | 96/184 |
| 5,728,200 A | * | 3/1998 | Bekedam | 96/158 |
| 5,743,968 A | * | 4/1998 | Leeker et al. | 134/2 |
| 6,004,469 A | * | 12/1999 | Sanders et al. | 210/763 |
| 6,245,555 B1 | * | 6/2001 | Curtis | 435/289.1 |
| 6,251,167 B1 | * | 6/2001 | Berson | 95/263 |

* cited by examiner

Primary Examiner—Peter A. Hruskoci
(74) Attorney, Agent, or Firm—Frost Brown Todd LLC

(57) ABSTRACT

The present invention provides a process for the removal of hydrogen peroxide from spent pickle liquor used in a steel strip pickling process. The process utilizes an enclosed decomposition tank which includes a pickle liquor inlet pipe, an outlet pipe, at least one vent pipe, an internal baffle, and a heat source.

4 Claims, 1 Drawing Sheet

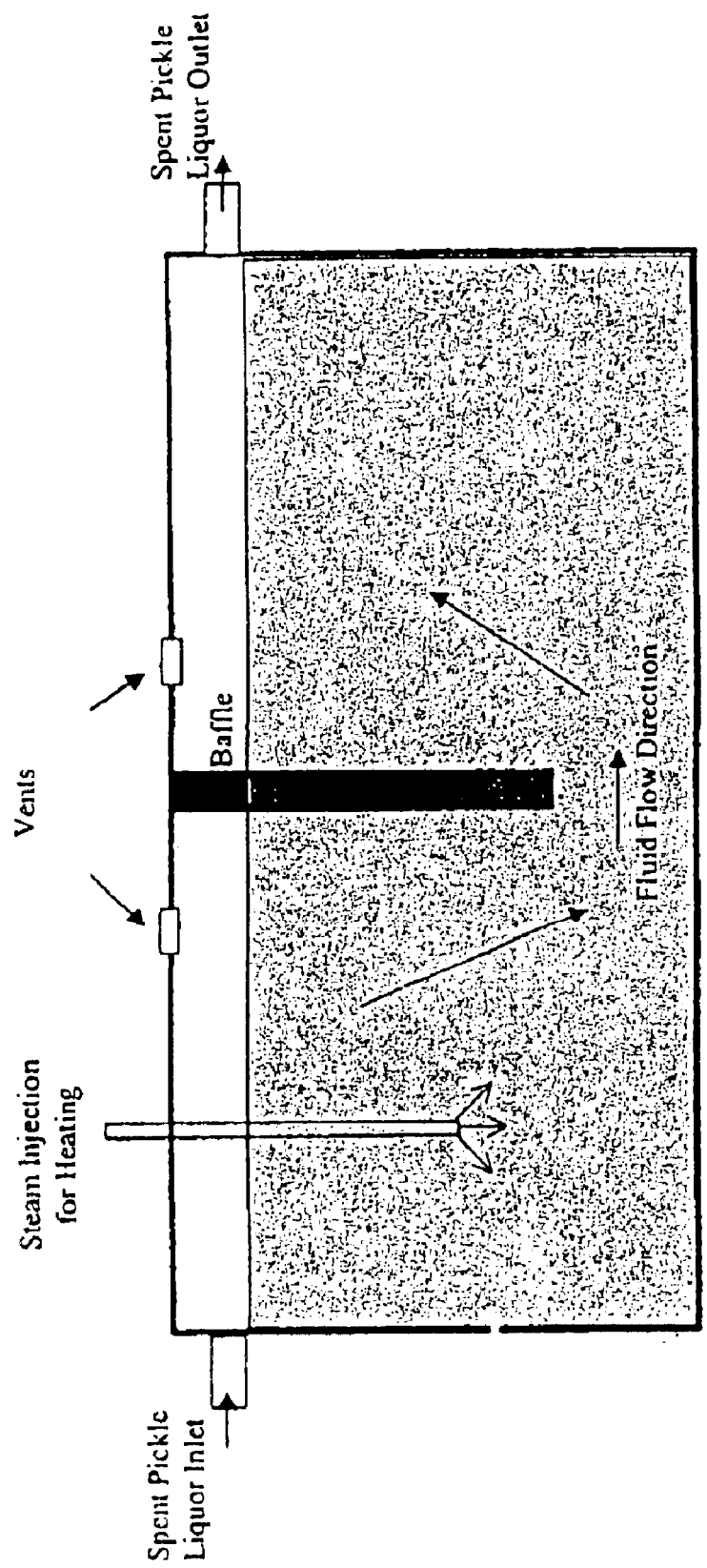
Figure 1: Decomposition Tank

US 6,802,965 B2

APPARATUS FOR REMOVING HYDROGEN PEROXIDE FROM SPENT PICKLE LIQUOR

This application is a divisional U.S patent application Ser. No. 10/119,112 filed on Apr. 9, 2002 which is based on and claims priority from U.S. provisional Patent Application Ser. No. 60/282,563, Vijay N. Madi and Jarald W. Leeker filed Apr. 9, 2001.

FIELD OF INVENTION

This invention relates to a process for the removal hydrogen peroxide from spent pickle liquor. More specifically, this invention provides a thermal process for the decomposition of hydrogen peroxide that is present in spent pickle liquor generated from a pickling process for steel.

BACKGROUND

When hydrogen peroxide is used as a component in an acidic pickle liquor solution, some amount of unreacted hydrogen peroxide remains in the spent pickle liquor waste stream. This spent pickle liquor is typically neutralized prior to its disposal. The unreacted hydrogen peroxide may be present in both the rinse water and in the spent pickle liquor solution. When considerable amounts of unreacted hydrogen peroxide are present in the spent pickle liquor, the acid neutralization step can be problematic. Thus, it is desirable to remove hydrogen peroxide from spent pickle liquor.

Conventional methods for removal of hydrogen peroxide from spent pickle liquor consist of the addition of reagents that chemically react with and consume the hydrogen peroxide present in the pickle liquor. Traditionally, the addition of sodium bisulfite, ferrous sulfate, or metallic iron to the spent pickle liquor have been used to decompose any hydrogen peroxide present in the solution and form water and oxygen. The use of sodium bisulfite is expensive. The use of ferrous sulfate or metallic iron result in an increased volume of solid sludge waste during the neutralization step.

The present invention provides an economically viable means for the removal of hydrogen peroxide from spent pickle liquor prior to acid neutralization.

SUMMARY OF THE INVENTION

The present invention provides an apparatus and a process for the removal of hydrogen peroxide from spent pickle liquor used in a steel strip pickling process.

Generally, the apparatus comprises a tank equipped with an inlet, an outlet, at least one vent, a heat source and an internal baffle. The tank is of sufficient capacity to accommodate a quantity of pickle liquor solution generated by a pickling process, wherein the pickle liquor residence time in the tank is from about 30 minutes to about 60 minutes and preferably is about 45 minutes. The heat source may be any type known to one skilled in the art, for instance, steam injection or at least one immersion heater.

Generally, the process comprises flowing the spent pickle liquor into an enclosed and vented decomposition tank through an inlet. The tank is of sufficient capacity to accommodate the quantity of solution generated by a pickling process. The spent pickle liquor is then heated to at least about 65° C. and maintained at a temperature of at least about 65° C. in the decomposition tank for about 30 minutes to about 60 minutes. In another embodiment, the pickle liquor is heated to at least 76° C. Once heated for the appropriate amount of time, the heated pickle liquor is flowed out of the tank through an outlet.

Generally, the heated pickle liquor is flowed out of the decomposition tank at about the same rate as the pickle liquor is flowed into the tank to achieve a pickle liquor residence time sufficient to decompose the hydrogen peroxide in the decomposition tank, typically about 45 minutes. The decomposition tank also comprises at least one vent and an internal baffle. Any heating method known in the art may be used and typical heat sources include steam heat or at least one immersion heater. Given the above parameters for the decomposition tank, it would be obvious to one skilled in the art to vary the temperature of the tank, flow rate of the pickle liquor solution and residence time of the pickle liquor in the decomposition tank for effective decomposition of the hydrogen peroxide.

BRIEF DESCRIPTION OF THE DRAWINGS

FIG. 1: Schematic diagram of the thermal decomposition tank for treatment of spent pickle liquor containing hydrogen peroxide.

DESCRIPTION OF INVENTION

The present invention is designed to minimize hydrogen peroxide concentration from spent pickle liquor prior to the acid neutralization step through the thermal decomposition of the hydrogen peroxide to form water and oxygen gas as shown in the following reaction:

$$2H_2O_2 \xrightarrow{heat} 2H_2O + O_2$$

The present invention comprises an enclosed decomposition tank, as shown in FIG. 1. The decomposition tank includes a pickle liquor inlet, an outlet, at least one vent, an internal baffle, and a heat source. The tank volume is such that the minimum residence time required for the spent pickle liquor to pass through the tank and allow for complete decomposition of the hydrogen peroxide is met. The heat source must be able to heat the spent pickle liquor to a minimum specified temperature. The function of the internal baffle is to direct fluid flow, cause mixing, and ensure that the spent pickle liquor meets the minimum residence time requirement. The spent pickle liquor is transferred into the decomposition tank at a rate not exceeding the heating capacity of the tank and transferred out of the tank at a matching rate. Since oxygen gas is produced by the thermal decomposition of the hydrogen peroxide, at least one vent is necessary in order to relieve the pressure from inside the tank.

The decomposition tank volume is designed to allow for a liquor residence time sufficient to allow for decomposition of the hydrogen peroxide, preferably from about 30 minutes to about 60 minutes, and more preferably about 45 minutes. Once in the tank, most or all of the spent pickle liquor is heated to a temperature of at least about 65° C., and preferably above 76° C., during which time the hydrogen peroxide decomposes to form water and oxygen. The source of heat may be any heating method known in the art, for example steam injection or immersion heaters.

EXAMPLE

A hydrogen peroxide decomposition tank is installed on a steel pickle line in order to collect the waste pickle liquor stream. The spent pickle liquor flow rate exiting the pickling tank and entering the decomposition tank is as high as 20 gallons per minute. The waste stream from the pickling tank (the spent pickle liquor) is combined with the acidic rinse water from the pickle line to create a total flow rate that is as high as 40 gallons per minute. The decomposition tank has about a 2000 gallon capacity. Given the flow rate and tank capacity, the minimum hydraulic residence time for the waste solution is about 45 minutes.

The tank is then heated to 76° C. using the steam injection method. The following table shows the concentration of hydrogen peroxide entering and leaving the decomposition on tank during pickling operations.

| Hydrogen Peroxide Concentration | |
|---|---|
| Entering the Tank | Exiting the Tank |
| 2.4% | 0.05% |
| 2.3% | 0.12% |
| 2.7% | 0.07% |
| 2.6% | 0.05% |

What is claimed is:

1. An apparatus for removal of hydrogen peroxide from spent pickle liquor used in a pickling process, said apparatus comprising:
   a. an enclosed tank of sufficient capacity to accommodate a quantity of a solution containing hydrogen peroxide generated by a pickling process for steel, wherein said solution is retained within said tank for a residence time of from about 30 minutes to about 60 minutes;
   b. an inlet, wherein said inlet facilitates the passage of solution containing hydrogen peroxide into said tank;
   c. an outlet, wherein said outlet facilitates the passage of a reduced hydrogen peroxide concentration from the tank;
   d. at least one vent in said tank, wherein said vent is adapted to relieve the oxygen gas pressure within said tank associated with the decomposition of hydrogen peroxide;
   e. a heat source selected from the group consisting of a steam injection heater and an immersion heater for removal of hydrogen peroxide by decomposition to water and oxygen gas, wherein at least a portion of said heat source is positioned within said tank; and
   f. an internal baffle, wherein said tank is installed on a waste pickle line to collect said spent pickle liquor.

2. The apparatus of claim 1 wherein said tank is sized and configured so that the pickle liquor residence time in said tank is about 45 minutes.

3. The apparatus of claim 1 wherein the heat source for said tank is steam injection.

4. The apparatus of claim 1 wherein the heat source for said tank is at least one immersion heater.

* * * * *